United States Patent
Verost

(10) Patent No.: US 7,527,581 B1
(45) Date of Patent: May 5, 2009

(54) EXERCISE BIKE AND SEAT COMBINATION ASSEMBLY

(76) Inventor: Brad J. Verost, 3305 Wallace Dr., Grand Island, NY (US) 14072

( * ) Notice: Subject to any disclaimer, the term of this patent is extended or adjusted under 35 U.S.C. 154(b) by 0 days.

(21) Appl. No.: 11/748,916

(22) Filed: May 15, 2007

(51) Int. Cl.
A63B 22/06 (2006.01)
A63B 22/08 (2006.01)

(52) U.S. Cl. ......................................... 482/57; 482/904

(58) Field of Classification Search .................. 482/51, 482/57–65, 79–80, 904, 910, 136–137; 601/36; D21/663–667; 440/12.63–12.64; 297/105, 297/118, 129, 188.08, 118.09, 188.1, 118.01, 297/236–237, 463.1; A63B 22/06, 22/08
See application file for complete search history.

(56) References Cited

U.S. PATENT DOCUMENTS

| | | | | |
|---|---|---|---|---|
| 1,336,774 A * | 4/1920 | Cooper | | 4/528 |
| 2,548,408 A * | 4/1951 | Tammen | | 601/32 |
| 3,127,171 A * | 3/1964 | Noland | | 482/94 |
| 3,259,385 A | 7/1966 | Boren | | |
| 3,738,649 A | 6/1973 | Miller | | |
| 3,968,963 A | 7/1976 | Sileo | | |
| 4,265,447 A | 5/1981 | Shafer | | |
| 4,534,553 A * | 8/1985 | Shirley | | 482/65 |
| 4,738,445 A * | 4/1988 | Lautenschlager | | 482/63 |
| 4,776,583 A * | 10/1988 | Jennings | | 482/63 |
| 4,792,135 A * | 12/1988 | Chin-Sen | | 482/138 |
| 4,805,901 A | 2/1989 | Kulick | | |
| 4,921,247 A * | 5/1990 | Sterling | | 482/138 |
| D340,269 S | 10/1993 | Stevens | | |
| 5,372,562 A * | 12/1994 | Chang | | 482/57 |
| 6,001,046 A | 12/1999 | Chang | | |
| 6,379,285 B1 * | 4/2002 | Maresh et al. | | 482/57 |
| 6,979,284 B2 | 12/2005 | Curtis | | |
| 2001/0051565 A1 * | 12/2001 | Alessandri | | 482/57 |
| 2006/0166792 A1 * | 7/2006 | Kuo | | 482/57 |

\* cited by examiner

Primary Examiner—Loan H Thanh
Assistant Examiner—Oren Ginsberg

(57) ABSTRACT

An exercise bike and seat combination assembly includes a frame with an upper portion and a plurality of legs attached to the upper portion. The upper portion has a front end, a back end and a central member. The central member has an elongated opening therein. A backrest is pivotally coupled to the back end. An exercise bike is positioned beneath the frame and includes a housing having a wheel rotatably attached thereto. A pedal assembly is mechanically coupled to the wheel. A post is attached to and extends upwardly from the housing and a bike seat is attached to an upper end of the post. The bike seat is positionable in a stored position beneath the upper portion or in a deployed position extending through the elongated opening. A seat panel is removably positioned on the top portion.

6 Claims, 3 Drawing Sheets

EXERCISE BIKE AND SEAT COMBINATION ASSEMBLY

BACKGROUND OF THE INVENTION

1. Field of the Invention

The present invention relates to exercise bike devices and more particularly pertains to a new exercise bike device for positioning within a vehicle so that the device may be used as either an exercising apparatus or as a seat.

2. Description of the Prior Art

The use of exercise bike devices is known in the prior art. While these devices fulfill their respective, particular objectives and requirements, the need remains for a device that can be mounted within a vehicle, such as a cab of a semi-truck, which is primarily used as a seat but which can be modified to be used as an exercise bike to provide exercise to a driver of the vehicle during rest stops. Further, the exercise bike should be hidden or disguised within the device when the exercise bike is not in use.

SUMMARY OF THE INVENTION

The present invention meets the needs presented above by generally comprising a frame that includes an upper portion and a plurality of legs that are attached to and extend downwardly from the upper portion. Each of the legs is attached to a bottom floor of a vehicle. The upper portion has a front end, a back end and a central member that extends between the front and back ends. The central member has an elongated opening extending therethrough that extends between the front and back ends. A backrest is pivotally coupled to the back end. The backrest is positioned in an upright position or in a collapsed position extending back from the frame. An exercise bike is positioned beneath the frame and includes a housing having a wheel rotatably attached thereto. A pedal assembly is mechanically coupled to the wheel so that the wheel rotates when the pedal assembly is rotated. A post is attached to and extends upwardly from the housing. The post has an upper end having a bike seat attached thereto. The post is telescopic and the bike seat is positionable in a stored position beneath the upper portion or in a deployed position extending over the upper portion through the elongated opening. A seat panel is removably positioned on the top portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
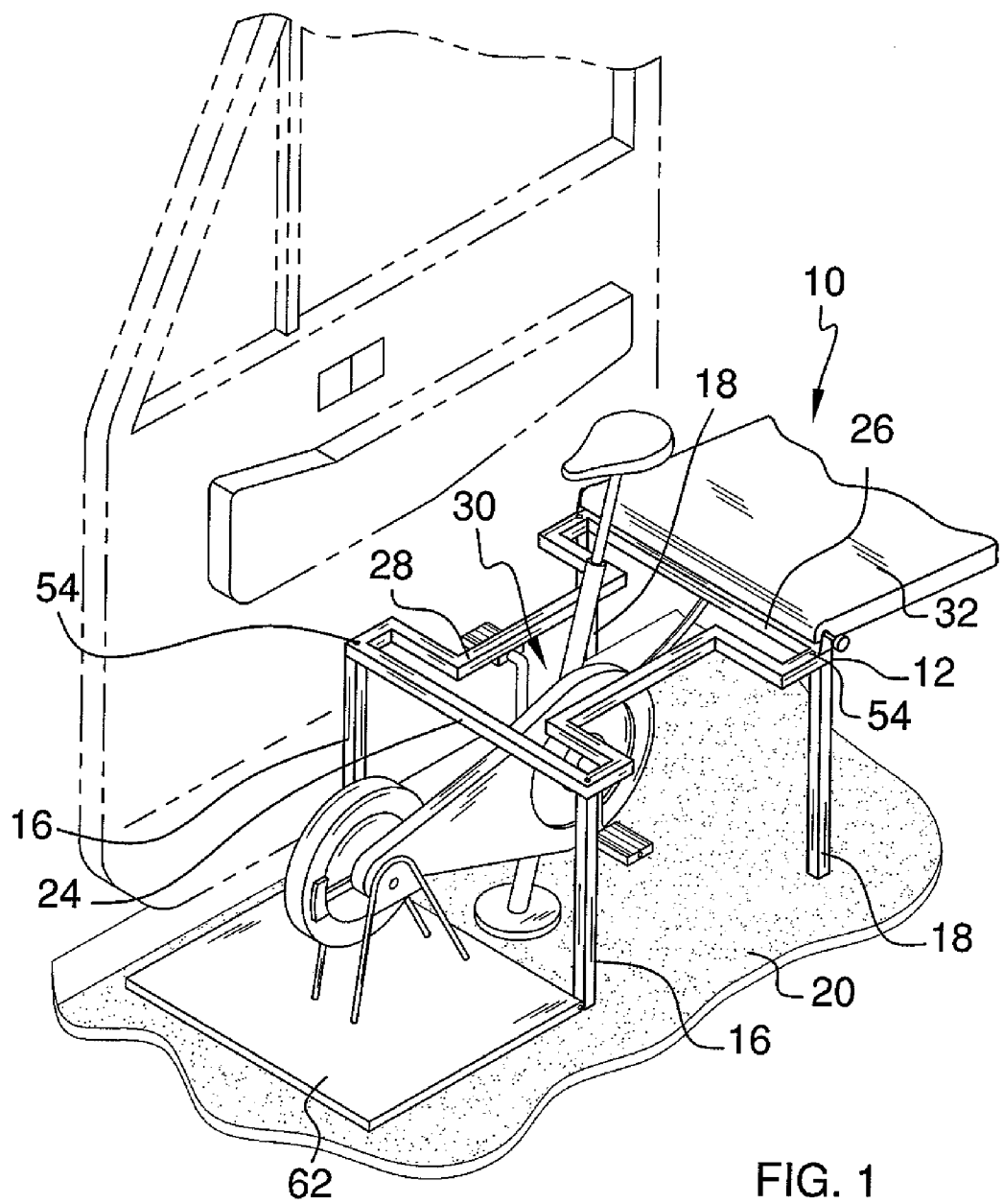
FIG. 1 is a perspective view of an exercise bike and seat combination assembly according to the present invention.
Figure 2:
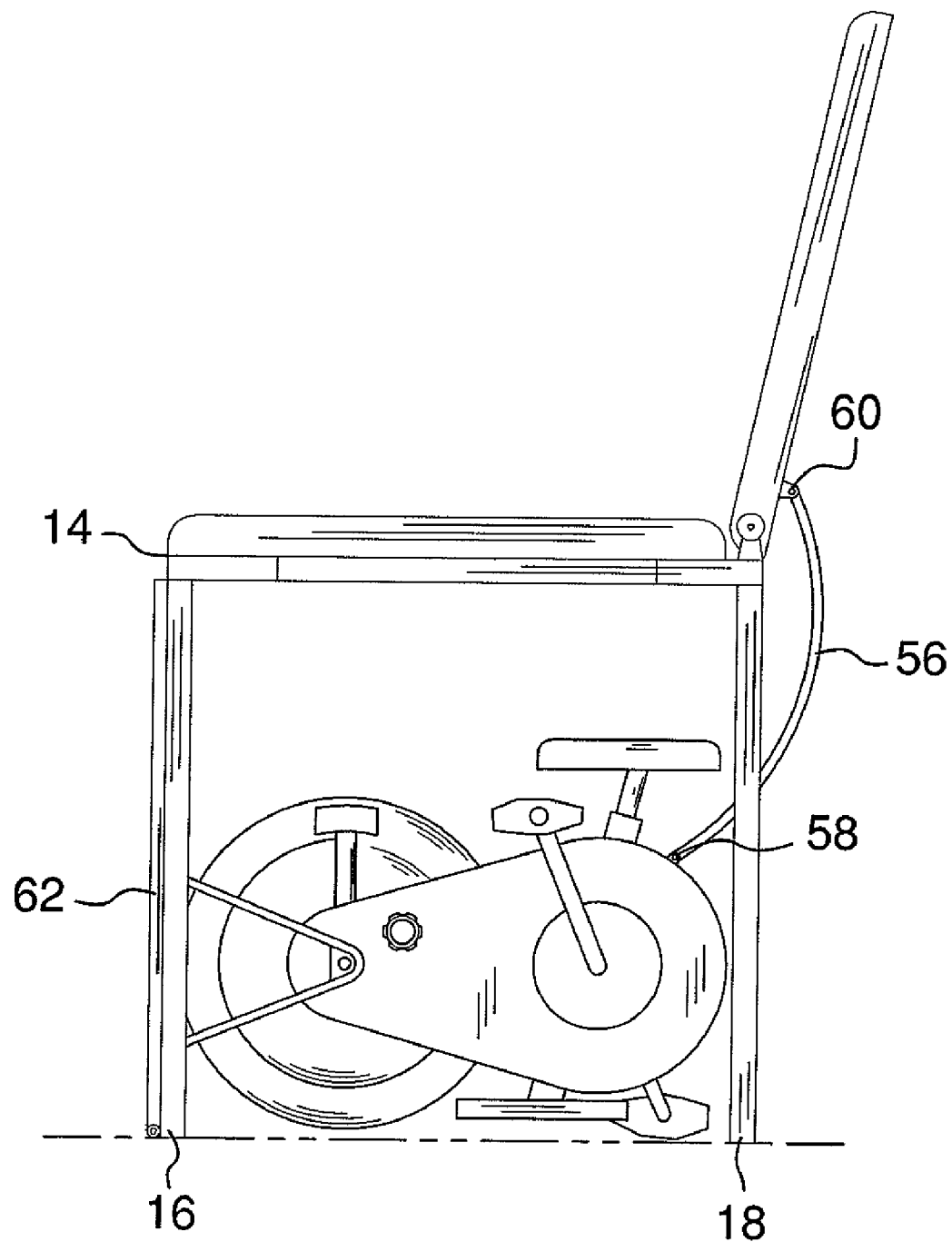
FIG. 2 is a side view of the present invention in a stored position.
Figure 3:
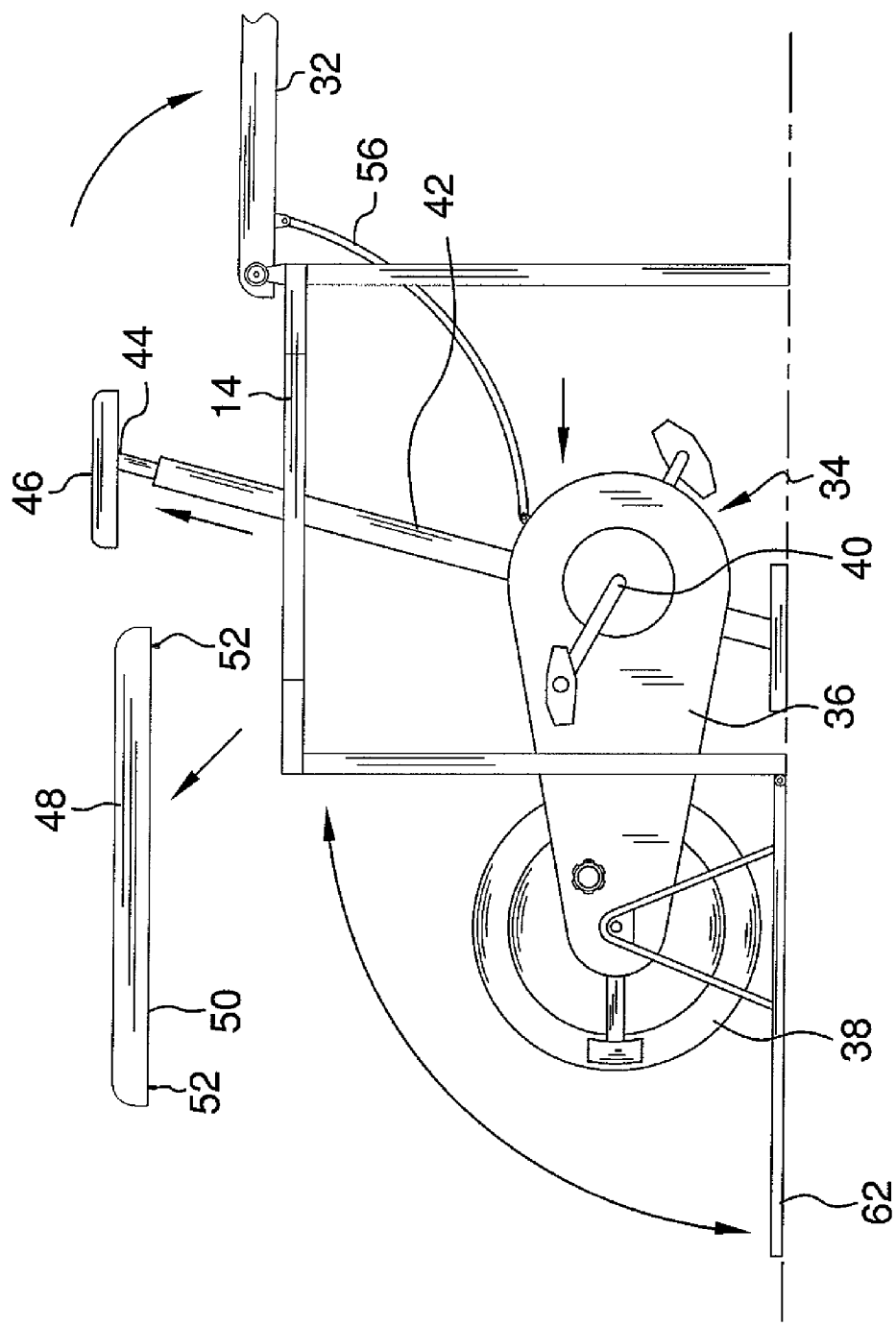
FIG. 3 is a side view of the present invention in a deployed position.

With reference now to the drawings, and in particular to FIGS. 1 through 3 thereof, a new exercise bike device embodying the principles and concepts of the present invention and generally designated by the reference numeral 10 will be described.

As best illustrated in FIGS. 1 through 3, the exercise bike and seat combination assembly 10 generally comprises a frame 12 that includes an upper portion 14 and a plurality of legs 16, 18 that are attached to and extend downwardly from the upper portion 14. Each of the legs 16, 18 is attached to a bottom floor 20 of a vehicle. The upper portion 14 has a front end 24, a back end 26 and a central member 28 extending between the front 24 and back 26 ends. The central member 28 has a width less than 1 foot taken perpendicular to a longitudinal axis of the upper portion 14 extending through and being perpendicular to the front 24 end. The front 24 and back 26 ends each have a greater width than the central member 28. The central member 28 has an elongated opening 30 therein extending between the front 24 and back 26 ends. A backrest 32 is pivotally coupled to the back end 26. The backrest 32 is positioned in an upright position or in a collapsed position extending back from the frame 12.

An exercise bike 34 is positioned beneath the frame 12. The exercise bike 34 is generally conventional and includes a housing 36 that has a wheel 38 rotatably attached thereto. A pedal assembly 40 is mechanically coupled to the wheel 38 so that the wheel 38 rotates when the pedal assembly 40 is rotated. A post 42 is attached to and extends upwardly from the housing 36. The post 42 has an upper end 44 having a bike seat 46 attached thereto. The post 42 is telescopic and the bike seat 46 is positionable in a stored position beneath the upper portion 14 or in a deployed position extending over the upper portion 14 through the elongated opening 30.

A seat panel 48 is removably positioned on the top portion 14. The seat panel 48 has a bottom side 50. A plurality of male couplers 52 is attached to the bottom side 50. The couplers 52 are extendable into apertures 54 extending into the top portion 14.

An arm 56 has a first end 58 pivotally attached to the housing 36 and a second end 60 pivotally attached to a back side of the backrest 32. The housing 36 is extended forward of the frame 12 by the arm 56 when the backrest 32 is in the collapsed position and is pulled under the frame 12 when the backrest 32 is in the upright position. When the housing 36 is pushed forward, the bike seat 46 is centrally positioned in the elongated opening 30. When the housing 36 is pulled rearward, it is placed under the upper portion 14 so that it does not extend outwardly in front of front legs 16 of the frame 12.

A front panel 62 is removably hingedly coupled to the frame 12. The front panel 62 is positioned in a vertical position extending upwardly from the floor surface 20 to the front end or in an open position lying on the floor surface 20.

In use, the frame 12 is used as a conventional seat for a vehicle and in particular a semi-truck cab. When the user of the assembly 10 wants to use the exercise bike 34, the seat panel 48 is removed and the backrest 32 placed in the collapsed position. This extends a portion of the exercise bike 34 forward of the frame 12. The bike seat 46 is then extended upwardly to proper height. The user of the assembly then sits on the bike seat 46 and pedals the exercise bike 34. When not in use, the exercise bike 34 is hidden by the frame, front panel and seat panel.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An exercise bike and seat assembly positioned within a vehicle, said assembly comprising:
    a frame including an upper portion and a plurality of legs being attached to and extending downwardly from said upper portion, each of said legs being attached to a bottom floor of the vehicle, said upper portion having a front end, a back end and a central member extending between said front and back ends, said central member having an elongated opening therein extending between said front and back ends;
    a backrest being pivotally coupled to said back end, said backrest being positioned in an upright position or in a collapsed position extending back from said frame;
    an exercise bike being positioned beneath said frame, said exercise bike including a housing having a wheel rotatably attached thereto, a pedal assembly being mechanically coupled to said wheel such that said wheel rotates when said pedal assembly is rotated, a post being attached to and extending upwardly from said housing, said post having an upper end having a bike seat attached thereto, said post being telescopic and said bike seat being positionable in a stored position beneath said upper portion or in a deployed position extending over said upper portion through said elongated opening; and
    a seat panel being removably positioned on said upper portion.

2. The exercise bike and seat assembly according to claim 1, wherein said central member has a width less than 1 foot, said front and back ends having a greater width than said central member.

3. The exercise bike assembly according to claim 1, wherein said seat panel has a bottom side, a plurality of male couplers being attached to said bottom side, said couplers being extendable into apertures extending into said upper portion.

4. The exercise bike and seat assembly according to claim 1, further including an arm having a first end pivotally attached to said housing and a second end pivotally attached to a back side of said backrest, said housing being extended forward of said frame by said arm when said backrest is in said collapsed position, said housing being pulled under said frame when said backrest is in said upright position.

5. The exercise bike and seat assembly according to claim 4, further including a front panel being removably hingedly coupled to said frame, said front panel being positioned in a vertical position extending upwardly from said bottom floor to said front end or in an open position lying on said bottom floor.

6. An exercise bike and seat combination assembly positioned within a vehicle, said assembly comprising:
    a frame including an upper portion and a plurality of legs being attached to and extending downwardly from said upper portion, each of said legs being attached to a bottom floor of the vehicle, said upper portion having a front end, a back end and a central member extending between said front and back ends, said central member having a width less than 1 foot, said front and back ends having a greater width than said central member, central member having an elongated opening therein extending between said front and back ends;
    a backrest being pivotally coupled to said back end, said backrest being positioned in an upright position or in a collapsed position extending back from said frame;
    an exercise bike being positioned beneath said frame, said exercise bike including a housing having a wheel rotatably attached thereto, a pedal assembly being mechanically coupled to said wheel such that said wheel rotates when said pedal assembly is rotated, a post being attached to and extending upwardly from said housing, said post having an upper end having a bike seat attached thereto, said post being telescopic and said bike seat being positionable in a stored position beneath said upper portion or in a deployed position extending over said upper portion through said elongated opening;
    a seat panel being removably positioned on said upper portion, said seat panel having a bottom side, a plurality of male couplers being attached to said bottom side, said couplers being extendable into apertures extending into said upper portion;
    an arm having a first end pivotally attached to said housing and a second end pivotally attached to a back side of said backrest, said housing being extended forward of said frame by said arm when said backrest is in said collapsed position, said housing being pulled under said frame when said backrest is in said upright position; and
    a front panel being removably hingedly coupled to said frame, said front panel being positioned in a vertical position extending upwardly from said bottom floor to said front end or in an open position lying on said bottom floor.

* * * * *